Oct. 27, 1964   J. E. BEBINGER   3,154,256
STOPPER FOR FOOD WASTE DISPOSER
Filed Dec. 18, 1961
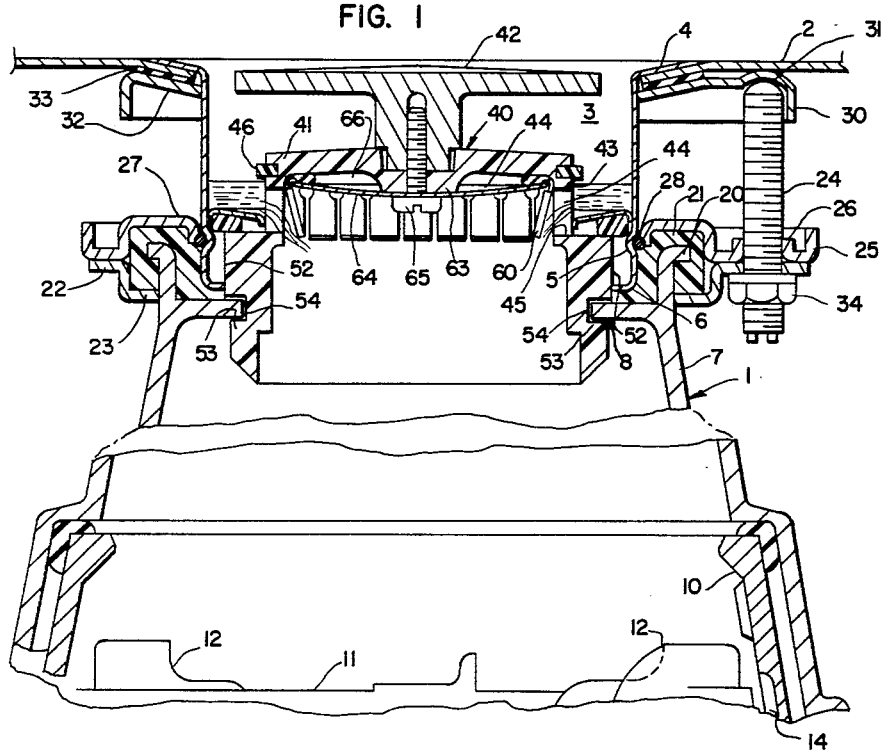
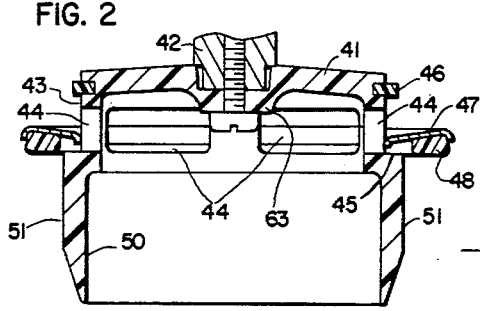
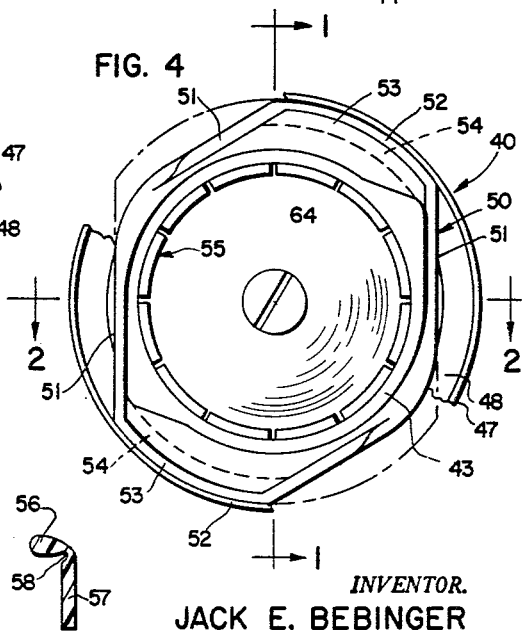
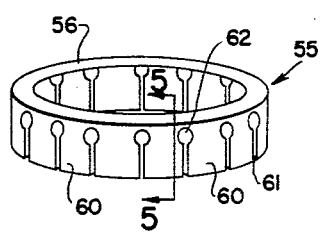
INVENTOR.
JACK E. BEBINGER
BY
ATTORNEY ated Oct. 27, 1964

3,154,256
STOPPER FOR FOOD WASTE DISPOSER
Jack E. Bebinger, Brookfield, Wis., assignor to General
Electric Company, a corporation of New York
Filed Dec. 18, 1961, Ser. No. 159,838
6 Claims. (Cl. 241—46)

This invention relates to food waste disposers of the type in which kitchen food waste is comminuted in a chamber receiving a flow of water during the comminution operation; and in particular, the invention relates to means for reducing the transmission of noise from the chamber during the comminution operation.

It is well known that domestic food waste disposers are sometimes disturbingly noisy in operation, for they operate on the basis of reducing food waste including bones, fruit pits and other hard objects, by impelling such waste against stationary cutting or abrading structures within a comminution chamber. This action is carried out in the presence of water so as ultimately to form a slurry of waste particles and water for easy flow from the disposer to the plumbing waste line of the building. Flow of water in quite substantial volume is required for the adequate operation of the disposer, and although some disposers provide for introducing the water into the comminution chamber through a side wall thereof, thus making it possible tightly to seal the inlet of the chamber—and thus close one avenue through which sound may be transmitted—the more usual practice provides for water flow into the chamber from the kitchen sink or the like in which the disposer is installed.

Workers in the art have recognized that much of the sound generated within the comminution chamber can pass quite freely through the openings which accommodate water flow into the chamber, and have offered disposer stopper constructions in which water may accumulate before passage into the chamber, and thus provide a water layer which is interposed in the path of the sound vibrations. My Patent No. 2,834,554 granted May 13, 1958 for "Splash Guards for Food Waste Disposers" and assigned to my present assignee, was one of the early efforts to utilize a segmented resilient baffle member to collect a layer of water as a sound deadening means. This device has been in successful use in many thousands of food waste disposers manufactured and sold by my assignee. However, it is difficult in such arrangements to accumulate a substantial layer of water, for the several segments of the member are individually of such large area as to yield readily to the flow of water.

Contemporary food waste disposers also utilize sound deadening coverings about the comminution chamber. Some additionally employ resilient mountings to dampen the transmission of sound vibrations from the disposer to the kitchen sink itself, which can act as a "sounding board" or sound amplifier. These "soundproofing" facilities are very effective for control of specific sound generation or transmission problems and it will be understood that food waste disposers embodying the present invention may advantageously employ such constructions.

The present invention utilizes a flapper valve arrangement embodying a closely spaced plurality of individual valve elements arranged in an upstanding position about the interior of a cylinder forming part of the stopper of the disposer. Advantageously, the several flap valves are integral parts of a ring of an elastomeric material such as polyvinyl chloride. The respective valve elements are arranged in covering relation to water flow passages in the stopper; and by selection of the thickness of the valve elements with respect to the hinge portions thereof, the valve members can restrict flow of water through said passages, to establish a deep annulus of water which is particularly effective to limit sound transmission.

It is therefore an object of the invention to provide a sound deadening structure for a food waste disposer in which a plurality of valve elements provides for an accumulation of an annulus of water to interrupt the transmission of airborne sound waves.

In the accompanying drawings which illustrate a presently preferred embodiment of the invention:

FIG. 1 is a fragmentary sectional elevation of a food waste disposer embodying the invention, showing in detail the inclusion of the flapper valve mechanism within the stopper and the yieldability thereof to pass water from the inlet fitting into the comminution chamber. The stopper is in section on lines 1—1 of FIG. 4;

FIG. 2 is a side sectional elevation of the stopper without the valve mechanism. The stopper is in section on lines 2—2 of FIG. 4;

FIG. 3 is a perspective view of the valve mechanism;

FIG. 4 is a bottom plan view of the stopper; and

FIG. 5 is a sectional elevation taken through the valve mechanism on lines 5—5 of FIG. 3.

As illustrated in FIG. 1, a food waste disposer 1 is mounted in the drain opening of a kitchen sink 2. The disposer itself is conventional in that it comprises a tubular inlet fitting 3 having a flange 4 which rests upon the peripheral wall of the drainage opening, and an inwardly spun bead 5 which forms a seat on which the stopper may rest as later described. The bottom edge 6 of the inlet fitting is spun inwardly to define the bottom opening of the fitting. The disposer further includes a comminution chamber 7 which is of frusto-conical shape. An inwardly extending upper flange 8 defines an inlet in communication with the open bottom of the inlet fitting. The lower portion of the chamber contains a comminution element 10 providing what is known in the art as a "shredding ring," and a rotatable flywheel 11, having hammer-like structures or impellers 12, forms the actual base of the chamber. As is well known, the flywheel is mounted on the vertically extending shaft (not shown) of a motor (not shown) housed in a lower portion of the disposer; intermediate the motor and the flywheel there is an outflow compartment (not shown) into which a slurry of waste particles and water passes for discharge to the plumbing waste system (not shown) to which the sink is normally connected. This slurry of waste particles and water is generated by the comminution of the food waste in the presence of water. As is well known, it passes from the comminution chamber to the discharge chamber by way of means such as a plurality of grooves 14 formed in the wall of the shredding ring 10. The electric energy for the motor is controlled by any conventional switch means (not shown) either mounted in the upper side wall of the comminution chamber itself or at any other suitable location, as is well understood in the art.

Further describing the conventional elements of the disposer, an outwardly extending flange 20 at the upper end of the chamber 7 interfits within the heavy annulus 21 of rubber or the like which provides one of the sound absorbing means previously noted. The mounting structure by means of which the disposer is secured to the sink includes a ring 22 having a flange 23 on which the bottom of the annulus 21 rests. This ring is apertured to pass the threaded studs 24. In the usual disposer mounting there are three such apertures and studs placed at approximately 120° intervals. Also, the mounting structure includes a second ring 25 having the threaded bosses 26 to receive the studs. Ring 25 has a downwardly extending innermost wall 27 which is configurated to engage a ring 28 which snugly fits within the groove 5 formed in the wall of the inlet fitting. Also, the mounting structure includes the ring 30 having pockets 31 within which seat the rounded ends of the studs 24; said ring also has a conical inner rim 32, the slope of which conforms to the customary slope of the sink bottom about its drainage opening. It is the usual practice to interpose a flat annular gasket 33 between the rim 32 and the adjacent sink bottom.

It will be apparent that the rim 4 of the inlet fitting and the engagement of the wall 27 with the ring 28 are the means by which the disposer is suspended from the sink. The upward effort of the studs 24 against the ring 30 as the studs are made tight and secured with the lock nuts 34 which carry the ring 22, draws the flange 4 of the inlet fitting tightly against the sink bottom.

A stopper 40 is arranged to perform the multiple functions of sealing the inlet to the chamber 7 when it is desired to fill the sink bowl with water; to position the stopper in a manner permitting manual drainage from the sink bowl into the chamber for passage therethrough to the plumbing waste line; and in this latter position to admit water into the chamber 7 during a comminution operation while securing the stopper against axial displacement relative to the inlet fitting.

Referring now to FIGS. 2 and 4, the stopper comprises a structure preferably molded from a low water absorption type material such as the E. I. du Pont de Nemours nylon known commercially as Zytel 31. The stopper has a circular top 41 having a central aperture into which extends the shaft of a handle 42; said top is otherwise imperforate. This top portion also includes a cylindrical side wall 43 having a plurality of elongated apertures 44. The base of these apertures is at a substantially oval shoulder 45. Above the openings the side wall 43 is grooved to removably receive a gasket 46 which projects radially outwardly therefrom. The shoulder 45 accommodates a sealing structure which includes an annular facing 47 of a metal such as stainless steel configurated to contain an annular sealing member 48 of rubber or other suitable elastomer. The facing 47 is concave in the upward direction, and when it is in its FIG. 2 position serves to funnel water toward the openings when the disposer is in operation and is then receiving a substantial flow of water from the sink bowl. The facing 47 fits freely about the side wall 43 for axial movement thereon and its outside diameter is such that its sealing member 48 will seat on the bead 5 about the lower portion of the inlet fitting 3. It will be understood that in assemblying the stopper the sealing member is slipped over the wall 43 and the gasket 46 then installed. Said gasket obviously prevents the subsequent escapement of the sealing member and in addition cooperates with the inner edge portion of the sealing member to complete the seal against inflow of water to the chamber 7 when the sink bowl is to retain water.

It will be obvious that below the cylindrical portion 43 the stopper must be shaped, and the opening defined by the flange 8 of the comminution chamber cooperatively shaped, to permit the stopper to be in its flow position as in FIG. 1, or in a position (not shown) in which the body of the stopper extends through the opening to permit the gasket 46 to engage the facing 47. As above noted, the seal 48 will seat on the bead 5 and thus support the stopper in its sealing position. Also, although it is not necessary during normal sink drainage, it is desirable that during the operation of the disposer, the stopper be secured within the inlet fitting.

To accomplish these objectives the skirt portion 50 of the stopper is of a generally oval shape, characterized by the opposed flat wall portions 51 and the opposed arcuate portions 52. The inlet opening defined by the flange 8 of the comminution chamber has a shape approximating that shown in dot-dash line in FIG. 4, whereupon it will be apparent that by rotating the stopper to bring the oval shape of the skirt 50 into registry with the inlet opening the stopper may be dropped to its sealing position previously described. When the stopper is rotated about its axis the portions 52 may be positioned to rest upon flange 8 to establish the stopper in a normal "sink drain" position. It will be noted in FIGS. 1 and 4 that below the portions 52 the skirt 50 has somewhat smaller extensions 53 axially spaced from the portions 52 to provide grooves 54. When the stopper is further rotated after the engagement of the portions 52 with the top of the flange 8, the portions 53 will be brought beneath said flange whereupon diametrically opposite portion of the flange will be confined within the groove 54. This makes it impossible to lift the stopper out of the inlet opening. During a comminution operation when food waste is being violently tumbled about within the chamber 7, and upwardly propelled or deflected waste of a solid nature frequently strikes the stopper from below, the restraint provided by the walls of the groove 54 prevents the stopper from being jarred or vibrated out of operating position.

FIG. 3 shows in perspective view, the water control valve structure 55. It comprises a cylindrical structure preferably molded from polyvinyl chloride to provide a relatively heavy inwardly directed top flange 56, a skirt 57, which may be of the order of $\frac{1}{16}''$ thick, and a continuous groove 58, (FIG. 5) to provide a hinge between the flange and the skirt. The wall thickness at the hinge is of the order of .020 inch. The skirt is slit to provide a plurality of individual flapper valves 60, each being about one quarter of an inch in width, and having a depth sufficient to completely cover the adjacent opening 44 of the stopper. The slits 61 defining the individual flapper valves may be from $\frac{1}{32}$ to $\frac{1}{16}$ inch in width, and preferably terminate in circular ends 62 having a diameter of the order of $\frac{5}{32}$ inch. This configuration gives sufficient resilience to the flapper valves so that the inward deflection thereof during water flow into the inlet fitting 3 will accumulate an annular water seal about $\frac{1}{2}$ inch in depth. This seal completely submerges the openings 44, leaving no air space through which sound waves may pass freely.

The valve is held within the stopper by means providing a sound deadening air space at the top of the stopper. It will be noted in FIGS. 1 and 2 that the stopper has a circular boss 63 extending to just below the top of the inlet openings 44. The valve attachment means comprises a resilient disc 64 of about $\frac{1}{32}$ inch brass stock formed in concave shape and apertured to permit passage of the handle retaining screw 65. The diameter of the disc is such that it extends across substantially the full extent of the lower surface of the flange 56 in the valve structure 55, and its initial concavity is such that when the screw 65 is made home the disc is stressed so as to clamp the flange 56 tightly against the bottom of the stopper. This arrangement provides a trapped air layer 66 which of itself contributes to the sound deadening qualities of the stopper construction. Thus a disposer stopper embodying the present invention provides not only an annular layer of water of sufficient depth to form a sound transmission barrier, but a double top wall for the stopper itself further to prevent the free travel of sound waves therethrough.

While there has been described what is at present thought to be the preferred embodiment of the invention, it will be understood that various modifications may be made therein and it is intended to cover in the appended claims all such modifications as fall within the true spirit and scope of the invention.

I claim as my invention:

1. In a food waste disposer having a tubular inlet fitting adapted to be secured within the drainage opening of a kitchen sink to receive water therefrom, said fitting having means providing a valve seat, and a comminution chamber supported below said inlet fitting to receive water passing therethrough, the improvement comprising:

a stopper adapted to be removably disposed within said inlet fitting, said stopper having an imperforate top wall and a cylindrical side wall defining a passage opening into said comminution chamber, said side wall being substantially smaller in diameter than said inlet fitting and having a plurality of passages through which water may flow from the inlet fitting, means providing an annular valve disc disposed about said side wall for axial movement between a first position in which said side wall openings are below said disc and a second position in which said openings are substantially wholly above said disc, said disc in said first position being adapted to provide a seal extending between said imperforate top wall and said valve seat, means for optionally positioning said stopper in said inlet fitting to establish said disc in either its first or its second-named positions, and means effective when said disc is in its second-named position to restrict flow of water through said side wall openings to effect the accumulation of an annular ring of water exteriorly of said cylindrical stopper wall, comprising valve means in covering relation to each of said side wall openings, said valve means all being yieldable under pressure exerted by the surrounding water to pass water through said openings.

2. The stopper structure according to claim 1, in which said water-flow restricting means comprises an annular member from which extends a cylindrical wall of elastomeric material, said wall being axially slit to provide at least one flap valve at each of said wall openings, said elastomeric side wall being interiorly of the cylindrical wall portion of said stopper, and said annular member being effixed to said stopper structure at the juncture of the top wall and said cylindrical wall portion thereof.

3. The stopper structure according to claim 2, further characterized by the employment of an imperforate disc secured to said imperforate top wall and engaging with said annular member to secure the same within said stopper, said imperforate top wall and said imperforate disc creating a body of confined air therebetween.

4. In a food waste disposer having a tubular inlet fitting adapted to be secured within the drainage opening of a kitchen sink to receive water therefrom, said fitting having means providing a valve seat, and a comminution chamber supported below said inlet fitting to receive water passing therethrough, the improvement comprising:

a stopper adapted to be removably disposed within said inlet fitting, said stopper having an imperforate top wall and a cylindrical side wall defining a passage opening into said comminution chamber, said side wall being substantially smaller in diameter than said inlet fitting and having a plurality of passages through which water may flow from the inlet fitting, means providing an annular valve disc disposed about said side wall for axial movement between a first position in which said side wall openings are below said disc and a second position in which said openings are substantially wholly above said disc, said disc in said first position being adapted to provide a seal extending between said imperforate top wall and said valve seat, means for optionally positioning said stopper in said inlet fitting to establish said disc in either its first or its second-named positions, and means effective when said disc is in its second-named position to restrict flow of water through said side wall openings to effect the accumulation of an annular ring of water exteriorly of said cylindrical stopper wall, comprising a plurality of flexible flap valves in covering relation to said side wall openings, said valves being arranged to partially uncover said openings under pressure exerted by said ring of water to permit flow of water through said openings.

5. The stopper structure according to claim 4, in which said flap valves are integral portions of an elastomeric cylinder secured within said cylindrical wall portion of said stopper.

6. The stopper structure according to claim 4, in which said annular disc has a concave wall facing upwardly into said inlet fitting, whereby when said disc is in its said second-named position it serves to funnel water toward the base of the respective flap valves.

References Cited in the file of this patent

UNITED STATES PATENTS

| | | |
|---|---|---|
| 2,853,248 | Long | Sept. 23, 1958 |
| 2,896,866 | Hyde | July 28, 1959 |
| 2,948,482 | Jordan | Aug. 9, 1960 |